United States Patent [19]

Oishi et al.

[11] 4,037,078

[45] July 19, 1977

[54] PROCESS FOR WELDING ALUMINUM AND ALUMINUM ALLOYS IN HORIZONTAL WELDING POSITION

[75] Inventors: Minoru Oishi; Naoki Okuda, both of Fujisawa; Makoto Tomita, Yokohama; Toshisada Kashimura, Tokyo; Syozi Koga, Kamakura, all of Japan

[73] Assignee: Kobe Steel Ltd., Kobe, Japan

[21] Appl. No.: 537,698

[22] Filed: Dec. 31, 1974

[30] Foreign Application Priority Data

| May 23, 1974 | Japan | 49-58477 |
| July 29, 1974 | Japan | 49-85993 |
| Sept. 4, 1974 | Japan | 49-101402 |
| Sept. 4, 1974 | Japan | 49-101403 |
| Sept. 6, 1974 | Japan | 49-103377 |
| Sept. 21, 1974 | Japan | 49-109331 |

[51] Int. Cl.² .............................................. B23K 9/00
[52] U.S. Cl. .................................. 219/137 R; 219/126
[58] Field of Search ............... 219/137 R, 126, 125 R, 219/124, 125 PL, 65, 73 R, 74

[56] References Cited

U.S. PATENT DOCUMENTS

| 2,916,600 | 12/1959 | Tichler | 219/137 R |
| 2,981,824 | 4/1961 | Kitrell | 219/125 R |
| 3,035,159 | 5/1962 | Deville et al. | 219/137 R |
| 3,328,556 | 6/1967 | Nelson et al. | 219/125 R |
| 3,515,843 | 6/1970 | Arivasu et al. | 219/125 R |
| 3,764,777 | 10/1973 | Sakabe et al. | 219/125 R |
| 3,800,116 | 3/1974 | Tanaka et al. | 219/125 R |
| 3,832,522 | 8/1974 | Arikawa et al. | 219/137 R |

OTHER PUBLICATIONS

Taylor Lyman, ed., *Metals Handbook,* Aug. 1971, pp. 326, 327.

*Primary Examiner*—J. V. Truhe
*Assistant Examiner*—Clifford C. Shaw
*Attorney, Agent, or Firm*—Oblon, Fisher, Spivak, McClelland and Maier

[57] ABSTRACT

Aluminum and aluminum alloys are welded in a horizontal welding position in which the base metals to be welded are vertically disposed in abutting relationship with the welding groove opened sidewise by oscillating the tip of the welding electrode in the widthwise direction of the abutted base metals and welding the base metals while maintaining the angle formed by the surface of the molten pool and the electrode on the advancing side thereof greater than 90°. The surface of the molten pool as used herein is defined as one which is parallel to the crater surface of the weld which results upon termination of welding by extinction of the welding arc.

7 Claims, 23 Drawing Figures

PROCESS FOR WELDING ALUMINUM AND ALUMINUM ALLOYS IN HORIZONTAL WELDING POSITION

BACKGROUND OF THE INVENTION

1. Field of the Invention

The present invention relates to a process for welding aluminum and aluminum alloys. More particularly, the invention relates to a process for welding the same in a horizontal welding position by applying the weld in a narrow weld groove opened sidewise in the automatic welding of aluminum structural materials having considerable thickness.

2. Description of the Prior Art

Recently, an increasing demand for aluminum and aluminum alloys (which will be referred to simply as aluminum alloys, hereinafter) as structural materials for use in aircraft, vehicles, ships, pressure vessels, and the like has developed. This need stems from the excellent corrosion resistance and high strength of aluminum and aluminum alloys as well as their light weight. As a result, the aluminum materials satisfy industrial demand. For instance, aluminum alloys have been increasingly used as cryogenics for transporting and storage reservoirs containing liquefied natural gases (LNG). Among the various types of reservoirs employed are spherical reservoirs which have thicknesses of 40 to 100 mm, which thicken to 200 mm at the equator. In the welding of this type of reservoir, welding in all positions such as flat positions, the vertical position, the horizontal position and variations thereof must be done.

It has been commonly believed that welding in a horizontal position is particularly difficult for the automatic welding of structural materials of large thickness. This is because of the unique characteristics of welding in a horizontal position, i.e., the influence of gravity on molten metal, which imposes limitations on the amount of deposited metal per any given welding pass. Further, if the amount of deposited metal exceeds the limitations on the amount of metal, welding defects result such as overlaps and the like, so that the amounts of welding current and deposited metal in any given pass should be limited to some extent.

There are many difficulties in the welding of aluminum alloys for the fabrication of structural bodies because of the physical and metallurgical characteristics of aluminum alloys, compared to other structural materials, such as iron-based structural materials.

The following problems are encountered in the welding of aluminum alloys of large thickness:

i. Steels have melting points of about 1500° C, while aluminum alloys have melting points of about 600° C. Thus, at the same heat input level, aluminum alloys, if an MIG welding process is used, yield greater amounts of deposited metals, which in turn hinder the direct impingement of a welding arc upon the base metal. Consequently, satisfactory penetration is not achieved. In order to cope with this problem, the electric current is increased. However, this results in a further increased amount of deposited metal. Consequently, an undesirable cycle exists in which, as the electric current is increased, the amount of deposited metal is increased. In addition, because the surface of the base aluminum alloy is normally covered with an oxide film when the base alloy is exposed to air, the melting point of the metal surface is about 2020° C which is much higher than the melting point of the underlying aluminum alloy base. It follows, then, that the mere contact of molten aluminum with the surface of the base metal does not melt the base metal because of the heat stored in the molten aluminum. This is well supported by the fact that when the cross-section of the weld bead is observed, deeper penetration is obtained in the direction in which the electrode is held, while poor penetration results in directions other than that which the electrode is held.

ii. The thermal conductivity of aluminum alloys is much greater than that of steels, so that the heat applied to the base aluminum alloys not only locally melts a welding zone, but also is dissipated or diffused in only a very short time because of its high thermal conductivity. Consequently, the amount of heat which is used to melt the base metal is limited to some extent. In addition, the heat applied to the base metal which melts the same, as well, is dissipated in only a short time, so that the molten pool solidifies rapidly.

iii. The welds of aluminum alloys suffer from microfissures which are a unique characteristic thereof. The microfissures referred to herein are minute or hair-line cracks which develop in the deposited metal or portion of the base metal, when the metal is subjected to the repeated cycle of melting, solidification and re-melting. Needless to say, the microfissures exert an adverse effect on the strength of the joint and consequently, it is essential to eliminate such microfissures. In this respect, the method by which the electrode is woven may be one of the causes for the microfissures, and thus the weaving of the electrode should maintain the molten pool to a given size, so that the range of weaving has to be controlled which limits the efficiency of the welding operation.

iv. Regarding the susceptibility to gas shielding conditions, steels give weld beads of good appearance even if somewhat poor shielding conditions prevail with the result that pits and blow holes form therein, whereas aluminum alloys give weld beads of impaired appearance, even if welding is done under slightly poor shielding conditions. For this reason, close care should be taken while welding, and a high level of skill is required therefor.

Many studies have been undertaken to solve the difficulties and shortcomings encountered in aluminum welding, while taking advantage of the excellent characteristics of aluminum alloys as well as the characteristics of welding in a horizontal welding position. However, no successful methods of welding aluminum alloys in a horizontal position have been reported. The MIG welding process is known as the only acceptable method which gives the highest efficiency in the welding of aluminum alloys in the horizontal welding position. In the MIG welding process, a V-shaped weld groove is adopted which has a groove angle of 70° to 90°, while the welding electrode is moved in a straight direction along the groove without oscillation. When the edges of base metals are welded, which have a thickness of 50 mm, and which are prepared to form V-shaped welding grooves which give an X-shaped weld groove when the base edges are placed together, as many as 35 to 55 welding passes are required on both sides of the weld to secure the base metals which results in time-consuming welding procedures. On the other hand, in the fabrication of spherically-shaped structures which have thicknesses of 100 mm to 200 mm, several hundred passes are required to prepare the welding bead. This not only requires a great amount of manpower, but also it is difficult to obtain welds free of defects.

In order to overcome the shortcomings experienced with the prior art welding processes, it is imperative that the amount of deposited metal per pass be increased. Consequently, a weaving or side-to-side motion of the electrode is employed to increase the amount of deposited metal. However, the weaving motion of the electrode determines the solution of the problems which arise from the characteristics of aluminum alloys. Japanese patent publication Nos. S45-9857 and S47-50504 show welding techniques which use a weaving motion of the tip of the welding electrode in the widthwise direction of the base metals. In this method, an electrode-supplying head portion located outside the welding groove is oscillated, or the rate at which the electrode is fed to the welding groove is varied which causes an oscillating motion of the tip of the electrode in the widthwise direction of the base metals. The methods disclosed are associated with the welding of steels in the vertical welding position. In these processes, only limited success is obtained in achieving good weld zones in the welding of aluminum alloys, in contrast to the welding of steels. Thus, when aluminum is welded according to the conventional welding processes, variations in the welding conditions because of variations in the lengths of the electrode which is projected into the welding groove, exerts a substantial influence on the characteristics of the weld zones, thus causing welding defects such as poor penetration. In addition, when base metals having a thickness as large as 100 mm are to be welded, it is impossible to insert a consumable electrode into the weld groove because the electrodes are not straight and for other reasons.

A need, therefore, continues to exist for a method of welding aluminum and aluminum alloys in which welding defects such as microfissures and poor penetration are eliminated.

SUMMARY OF THE INVENTION

Accordingly, one object of the present invention is to provide a process for welding aluminum and aluminum alloys in the horizontal welding position in which the base metals to be welded are placed in abutting relationship in the vertical direction, whereby the process permits the welding of aluminum and aluminum alloys of considerable thickness with ease under stable conditions.

Another object of the present invention is to provide a process for welding aluminum and aluminum alloys in the horizontal welding position, in which the base metals to be welded are placed in abutting relationship to the vertical direction, which process permits the positive penetration of the electrode into the surfaces of the weld groove, which surfaces are positioned in the depths of the groove, as well as satisfactory weld beads free of minute cracks or microfissures.

Yet another object of the present invention is to provide a process for welding aluminum and aluminum alloys in the horizontal welding position, in which the base metals to be welded are placed in abutting relationship to the vertical direction, which process permits highly efficient welding at a reduced number of passes.

Still another object of the present invention is to provide a horizontal welding process for vertically abutted aluminum and aluminum alloys base materials, wherein the weld groove is opened sidewise, and the tip of the electrode is oscillated in the widthwise direction of the base metals, such that the angle formed by the surface of the molten metal pool and the electrode is maintained greater than 90° on the advancing side of the weld.

A further object of the present invention is to provide a horizontal welding process for vertically abutted aluminum and aluminum alloys base materials, wherein the angle formed by the surface of the molten metal pool and the electrode is greater than 90° and wherein the welding voltage applied when the electrode is advanced in one direction of the weld groove is 1 to 6 volts greater than the voltage applied when the electrode is advanced in the direction opposite to the former.

Yet another object of the present invention is to provide a horizontal welding process for vertically abutted aluminum and aluminum alloy base materials in which helium or argon or a mixture of argon and helium is fed into the welding zone as a shielding gas.

Still a further object of the present invention is to provide a horizontal welding process for vertically abutted aluminum or aluminum alloys base materials in which the angle formed by the welding electrode and the lower surface of the weld groove when welding in an oscillating pattern is maintained within the range from 2° to 30° while the electrode is advanced in the direction opposite to that of the former, and while the angle formed by the electrode and the upper surface of the weld groove is maintained within the range from 0° to 15°.

Yet a further object of the present invention is to provide a horizontal welding process for vertically abutted aluminum and aluminum alloy base materials with two passes in a single layer in which the angle formed by the surface of the molten metal pool and the electrode is maintained at an angle larger than 90° on the advancing side of the weld, while the tip of the electrode is oscillated in the widthwise direction of the base metals and in which the angle formed by the electrode and the lower surface of the weld groove is maintained within the range of 2° to 30° per pass along the lower surface of the weld groove, while the angle formed by the electrode and the upper surface of the weld groove is maintained within the range of 0° to 15° per pass along the upper surface of the weld groove.

Yet another object of the present invention is to provide a horizontal welding process for vertically abutted aluminum and aluminum alloy base materials in which the tip of the electrode is oscillated 45 to 150 cycles per minute in the widthwise direction of the base metals to be welded.

Briefly, these objects and other objects of the present invention, as hereinafter will become more readily apparent, can be attained by a process for welding aluminum and aluminum alloys in a horizontal welding position in which the base metals are placed vertically in abutting relationship to form a welding groove which is opened sidewise by oscillating the tip of a welding electrode in the widthwise direction of the abutted base metals and welding the base metals at an angle maintained greater than 90°, which angle is formed by the electrode and the surface of a molten pool on the advancing side of the electrode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 shows electrode conditions during the traverse of the electrode through the welding zone, wherein

FIG. 7 shows welding of a single layer via two passes with the welding electrode by the process of the present invention, wherein FIG. 7a shows the angle formed by the electrode and the lower surface of the weld groove, and wherein

DETAILED DESCRIPTION OF THE PREFERRED EMBODIMENTS

The process of the present invention achieves highly efficient welding of aluminum alloys in the horizontal welding position, especially for narrow welding grooves, which are opened sidewise, by oscillating the tip of an electrode in the widthwise direction of the base metals where the angle of the electrode with respect to the surface of the molten pool is varied as required. In this respect, the surface of the molten pool as used herein is defined as the surface which is parallel to the crater surface of the weld, upon extinction of the arc, as will be described in more detail hereinafter.

Steels have a thermal conductivity lower than that of aluminum, and thus base metals may be melted because of the heat transmitted from the molten metal or from the radiant heat of the welding arc, so that the direction of the arc should be such as to block the flow of the molten metal by the force of the arc. However, aluminum alloys have extremely high thermal conductivity, so that the heat of the arc is only partially utilized to melt the base metals, while a considerably greater portion of the heat is dissipated. In addition, the molten pool of the base metal tends to solidify rapidly. In the light of these circumstances, it has been concluded that the arc should be directed or used to melt the base metals, rather than to block the flow of the molten pool.

Figure 1A:
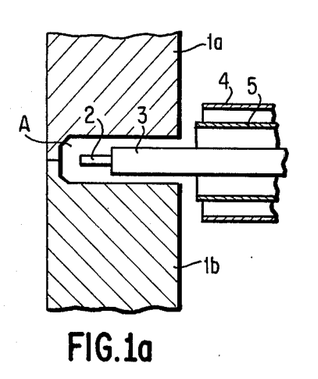
FIGS. 1a, 1b, 1c show the transverse and horizontal views of welding grooves in combination with electrodes as employed in the process of the present invention.
Figure 1B:
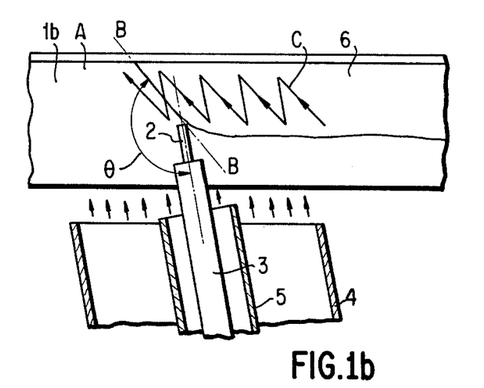
Figure 1C:
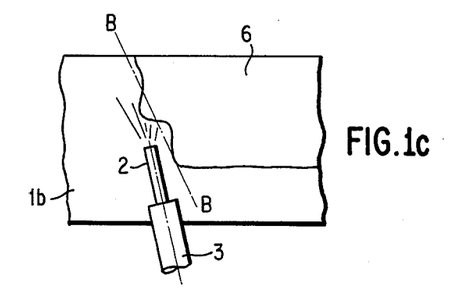

Referring to FIG. 1, aluminum alloy base metals are shown as 1a and 1b, with a narrow weld groove A therebetween and open on the sides. An electrode 2 is shown inserted into the weld groove A together with the current feeding tip 3. In this case, since it is difficult to completely shield the surfaces of the groove A to the depth thereof by means of only one nozzle, a nozzle of double-wall construction is adopted. Shown at 4 is an outer shielding nozzle which is adapted to feed a shielding gas over the entire surface of the weld zone, which encompasses an inner shielding nozzle 5 which is adapted to feed a shielding gas to the depth of the weld groove. The outer shielding nozzle 4 is mounted separately from the inner shielding nozzle so that the distance and angle of the inner nozzle 5 to the base metals 1a and 1b does not vary when the inner shielding nozzle 5 is oscillated. In other words, the outer shielding nozzle 4 is secured onto the welder (not shown), while an electrode, the current feeding tip thereof, and the inner shielding nozzle 5 are so mounted as to permit oscillation. FIG. 1b is a horizontal cross-sectional view of the weld groove A, i.e., a plane view of the cross-section, in which the electrode 2 is positioned so as to form an angle $\theta$ greater than 90° with the surface B—B of the molten pool. The angle $\theta$ is constantly maintained during welding. The surface of the molten pool has an irregular surface because of the force of the arc when the arc is discharged to start welding, as shown in FIG. 1c.

It should be noted as has been previously described that the surface of the molten pool as described herein is not the one immediately below the arc, but the one substantially parallel to the crater surface of the weld formed upon extinction of the arc, as is best shown by the line B—B in FIG. 1c. In other words, the surface of the molten pool is defined as the sloped end surface of the bead, which is formed as the welding proceeds. With this arrangement, the tip of the electrode is oscillated in a saw tooth pattern as shown in FIG. 1b (the locus or pattern shown by C). As is best shown in this figure, as the electrode advances towards the depth of the weld groove A, the tip of the electrode moves along the surface B—B of the molten pool, while forming an angle $\theta$ greater than 90° with the surface B—B of the molten pool. As a result, the arc produced at the tip of the electrode spreads all over the surface of the molten pool, while the deposited metal is melted by the outer, peripheral portion of the arc. Heat is imparted depthwise in the weld groove by the arc. In addition, the arc directly impinges upon the base metals, which melts the oxide films thereon. It is needless to mention that the oxide films on the upper and lower surfaces of the weld groove A, i.e., the surfaces above and below the tip of the electrode, are melted by the arc because of the absence of deposited metals thereon.

In the present process, argon is more functional as a shielding inert gas than helium, because the weight of helium is about 1/7 the weight of air, while that of argon is about 1.4 times as heavy as air. Thus, effective shielding of the weld zone is attained. However, helium has the advantage that a greater heat input is achieved than when argon is used with the result that deeper penetration is achieved which in turn leads to increased welding speed. For this reason, it is recommended that a gas mixture of argon and helium be used as the shielding gas, because the use of such a gas mixture permits the welding arc to spread, and affords good penetration. As the ratio of helium to argon is increased, a deeper penetration may be obtained so that the surface of the molten pool may be maintained larger.

FIG. 2 shows the pattern of the tip of an electrode which is oscillated in the plane perpendicular to the weld line, i.e., the locuses of the tip of the electrode. In this respect, when the gap of the weld groove is relatively small, a simple oscillating pattern may provide good welding results, as shown in FIGS. 2a and g, while when the groove gap is relatively large, the tip of the electrode should be oscillated so that positive penetration to both the upper and lower surfaces of the weld groove is obtained. Such examples are shown in FIGS. 2b through i. In this respect, the patterns shown are so determined as to provide heat to the surfaces of the weld groove uniformly, depending upon the shapes of the weld grooves.

The oscillating patterns shown in FIG. 2 are particularly suited for base metals having a relatively smaller thickness. In the case of base metals having thicknesses ranging from 100 to 200 mm., it is recommended that an overlaying method as shown in FIG. 3 be used. According to this method, the tip of the electrode is oscillated in such a manner that the size of the molten pool is maintained constant during welding, and such that the overlaid layers of the welds form a complete joint.

The angle formed by the surface of the molten pool and the electrode on the advancing side of the weed is preferably maintained from 100°–180°.

Having generally described this invention, a further understanding can be obtained by reference to certain specific Examples which are provided herein for purposes of illustration only and are not intended to be limiting unless otherwise specified.

EXAMPLE 1

Test conditions:
(a) Sample Material:
| | |
|---|---|
| Base metal: Al alloys JIS H 4000 (1970) and 5083-O | |
| thickness | 35 mm |
| Filler wire: Al MIG welding wire JIS Z 3232 (1970), A5183-WY, diameter | 1.6 mm |
| Shielding gas: Argon, Outer shielding gas | 50 liters/min. |
| Inner shielding gas | 25 liters/min. |
| Gap of weld groove | 8 mm. |
| Depth of weld groove | 20 mm. |

Figure 2A:
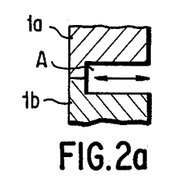
FIGS. 2a-2i are transverse cross-sectional views of welding grooves which show the locuses of the tip of the welding electrode which oscillates in the plane perpendicular to the welding line.
Figure 2B:
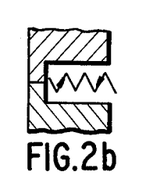
Figure 2C:
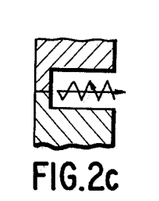
Figure 2D:
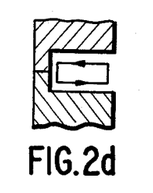
Figure 3A:
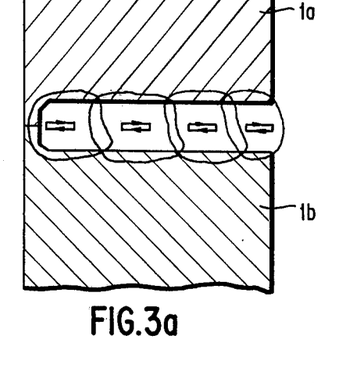
FIGS. 3a, 3b, are transverse cross-sectional view of welding grooves which show the overlaying method of welds according to the process of the present invention.
Figure 3B:
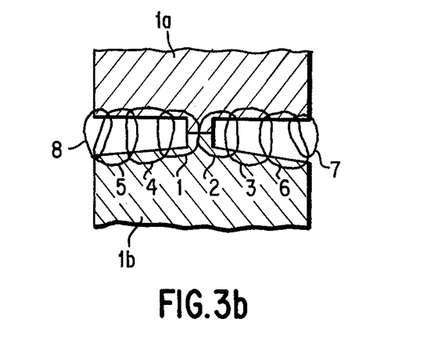

(b) Welding conditions:
| | |
|---|---|
| Welding current, voltage: | 250 to 270 A, 28 to 30 V |
| Oscillating pattern: | FIG. 2(a) |
| Rate of oscillation: | 50 cycles/min. |
| Width of oscillation: | 16 mm. |
| Angle $\theta$ : | about 120° |

In the welding of the alloy pieces, penetration of the welds as well as the cross-sectional shapes of the beads are both satisfactory. However, it was observed that when the angle $\theta$ is about 80°, poor penetration occurs in the deep portion of the weld groove.

Figure 4A:
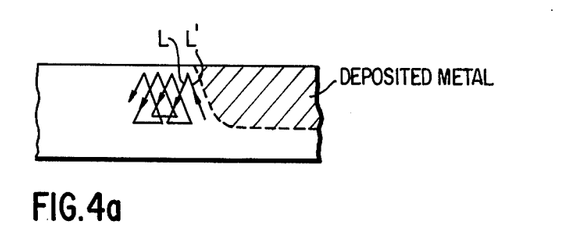
FIGS. 4a, 4b, 4c show the oscillating patterns of the electrode welding tip in the present process.
Figure 4B:
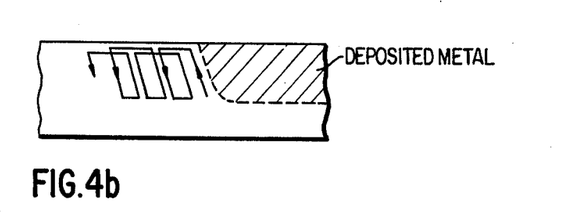
Figure 4C:
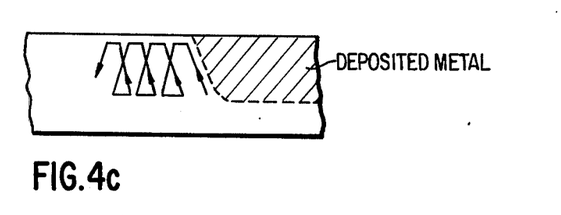

FIG. 4 shows the oscillation pattern of a welding electrode in which the welding voltage in the direction of the moving electrode tip is 1 to 6 volts higher than the voltage in the opposite direction, and vice versa. The directions in which the welding electrode may be moved are more explicitly defined to clarify how the electrode is moved in the welding groove. Suppose that one direction of the moving electrode in the weld groove is the direction of the aforesaid pattern, then the direction opposite to the former is such that the electrode is withdrawn from the weld groove towards the opening thereof. In this respect, a higher voltage may be used for either of the two opposing directions of the moving electrode provided a voltage difference of 1 to 6 volts results between the two. Alternatively, patterns other than those shown in FIG. 4 may be used so long as a voltage difference of 1 to 6 volts results.

Figure 5:
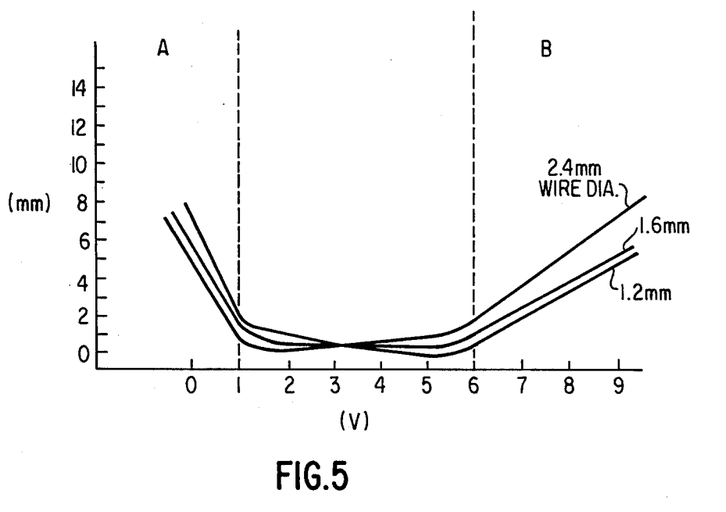
FIG. 5 is a diagram showing welding defects as a function of varying voltage differences.

The reasons why such a voltage difference of 1 to 6 volts should be used can be understood by reference to FIG. 5 which shows defects in weld zones because of the voltage difference in welding. In this figure, voltage difference is represented on the abscissa and the ordinate is the total length of the defects observed in the side-bending test to which a plate having a thickness of 100 mm is subjected. Zone A represents an imperfect fusion zone, while zone B represents an undercut zone. As shown in FIG. 5, voltage differences in the range of less than 1 V result in imperfect fusion of the surfaces of the weld groove, while the voltage differences in the range exceeding 6 volts lead to undercuts of a considerable size in the weld groove because of the high voltage application. Thus, the undercuts are not completely fused in the subsequent welding pass and are left as welding defects. However, voltage differences in the range of 1 to 6 V have proved to give good results.

In the actual welding, the patterns shown in FIG. 2 and FIG. 4 are combined to achieve a three-dimensional pattern for welding.

When aluminum and aluminum alloys are welded, good results may be obtained when argon is used as a shielding gas. However, better beads having a satisfactory cross-sectional configuration may be obtained by using helium or a mixture of helium and argon as a shielding gas, thus permitting expansion of the allowable range of the groove gap. Further, the process of the present invention can satisfactorily be applied to the welding of steels and other metals in addition to aluminum and aluminum alloys.

EXAMPLE 2

(1) Welding position: horizontal butt welding
(2) Sample Materials:
| | |
|---|---|
| Base metals to be welded: | Al alloys JIS H 4000 (1970) and 5083-O (thickness, 50 mm : groove gap, 10 mm.) |
| Filler wire: | Al MIG welding wire, JIS Z 3232 (1970), 5183-WY (2.4 mm) |
| Shielding gas: | |
| | outer shielding gas, argon 100 liters/min. inner shielding gas, 80% helium + 20% argon, 25 liters/min. |

(3) Welding conditions:
| | | |
|---|---|---|
| Welding current: | 350 A | |
| Welding voltage: | travel L | 30 V |
| | travel L' | 26 V |
| Rate of oscillation: | 72 cycles/min. | |
| Travel speed: | 32 cm/min. | |
| Oscillation pattern: | FIG. 3(a) | |

(4) Test results:
Appearance of beads: good

| | | Tensile test of joints | |
|---|---|---|---|
| No. | load (kg) | cross-sectional area (mm$^2$) | tensile strength (kg/mm$^2$) |
| 1 | 34.895 | 49.0 × 24.9 | 28.6 |
| 2 | 36.175 | 48.3 × 24.8 | 30.2 |

Side bending test: good

As is shown in the above table, the present invention permits highly efficient welding of the weld groove of aluminum alloy base metals of considerable thickness.

When the electrode follows a weaving motion in the welding operation and if the angle of the electrode inclined to the lower surface of the weld groove is zero, i.e., the electrode is maintained parallel to the lower surface of the weld groove, then the molten metal tends to flow towards the lower surface of the weld groove so that direct impingement of the arc onto the lower surface of the weld groove is hindered by the molten metal which results in imperfect penetration. In addition, the peripheral portion of the arc, rather than the center portion thereof, contacts the lower surface of the weld groove which results in a small amount of molten metal on the aforesaid lower surface. This also is responsible for imperfect penetration in the weld zone. On the other hand, the larger the angle of the electrode to the lower surface of the weld groove, the better the penetration. However, when the groove gap is relatively small, it is difficult to increase the angle of the electrode to the lower surface of the weld groove, although this depends on the thicknesses of the base metals. It follows that the angle is governed by the thickness of the base metal and the groove gap in actual operation.

If the electrode is moved in a weaving motion at an angle inclined towards the upper surface of the weld groove, then excessive penetration occurs in the base metals when the angle the electrode makes with the upper surface of the weld groove is too large. This tends to cause undercuts in the end surfaces of the bead. In addition to this, an increase results in the amount of the molten metal flowing to the lower surface of the weld groove, so that poor penetration occurs on the lower surface of the weld groove. This is particularly true with the welding of aluminum alloys. In other words, aluminum alloys have extremely high thermal conductivity, so that only a limited portion of the surface of the base metal on which the center portion of the arc impinges is melted, and in addition, the molten portion of such a base metal solidifies very rapidly. Furthermore, because of the low viscosity of the molten metal, increased amounts of molten metal stack on the lower surface of the weld groove so that the pattern of motion the electrode follows, i.e., the weaving motion of the electrode, leads to various welding defects.

To avoid these shortcomings, it is preferred that the tip of the electrode be oscillated in the widthwise direction of the base metals, that the angle formed by the surface of the molten pool and the electrode be larger than 90°, and that the electrode during oscillation be inclined at a specific angle to the upper surface or lower surface of the weld groove.

Figure 6A:
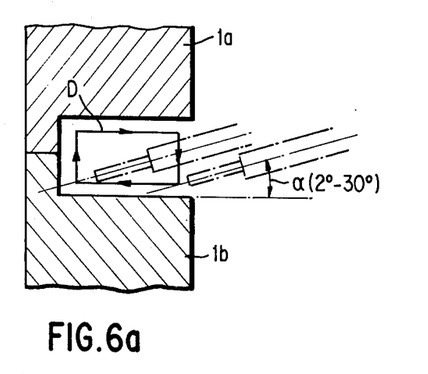
FIG. 6a illustrates the relationship between the electrode and the lower surface of the welding groove and FIG. 6b denotes the angles formed by the electrode and the upper surface of the welding groove.
Figure 6B:
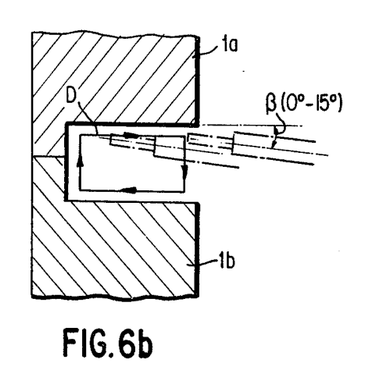

Reference is now made to FIGS 6a and b. In the situation where a weld groove is filled by a layer in one pass of the electrode, the tip of the electrode follows one pattern in one direction rather than the pattern in which the tip of the electrode follows the direction of travel. The tip of the electrode should be inclined to the side of the lower surface of the weld groove, when the tip of the electrode moves in close vicinity to the lower surface of the groove. On the other hand, when the tip of the electrode moves in close vicinity to the upper surface of the weld groove, the tip of the electrode should be inclined to the side of the upper surface of the groove. On the other hand, when the tip of the electrode follows the same locus in its traverse back into the weld groove, the tip of the electrode should be inclined to the side of the lower surface of the weld groove, and when the tip of the electrode moves back to the opening of the weld groove, the tip of the electrode should be inclined to the side of the upper surface of the weld groove. It should be noted that the angle formed by the electrode and the lower surface of the weld groove or by the electrode and the upper surface of the weld groove should be maintained within specific ranges.

Figure 7A:
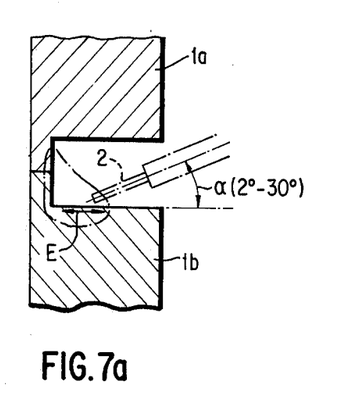
Figure 7B:
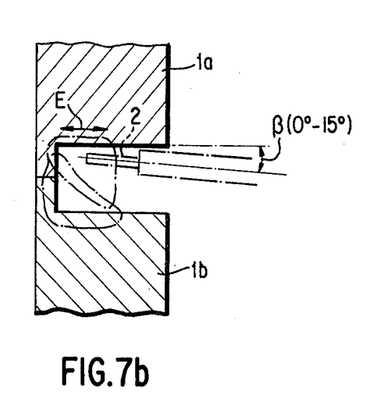
FIG. 7b shows the angle formed by the electrode and the upper surface of the welding groove.

In the embodiments shown in FIGS. 7a and b, however, the tip of the electrode may be oscillated in the widthwise direction of the base metals when welding along the weld line, with the tip of the electrode inclined to the side of the upper surface of the weld groove. Thereafter, upon completion of one welding pass, the tip of the electrode may be oscillated in the second welding pass, with the tip of the electrode inclined to the side of the lower surface of the weld groove, thereby completing one layer welding in two passes. In this case, as well, the angles of the electrode to the lower and upper surfaces, respectively, of the weld groove should be maintained within specific ranges.

In either case, it was found that it is satisfactory that the angle formed by the electrode and the lower surface of the weld groove should fall within the range of 2° to 30°, and that the angle formed by the electrode and the upper surface of the weld groove should be within the range of 0° to 15°. In this respect, when the electrode is inclined at an angle less than 2°, poor penetration results, as in the case when the electrode is held parallel to the lower surface of the weld groove. On the other hand, the larger the angle of the electrode to the lower surface of the weld groove up to 90°, better and deeper penetration may be obtained, because the center portion of the welding arc which has the highest temperature, impinges on the base metals, so that the small amount of molten metal on the lower surface of the weld groove does not hinder satisfactory penetration of the electrode. Meanwhile, when narrow weld grooves are used, such as single-bevel, V and I type grooves, the aforesaid angle is limited up to 30° when the tip of the electrode is inserted to the depth of the weld groove. However, needless to say, for a pass close to the opening of the weld groove, the aforesaid angle should preferably be increased to achieve deeper penetration.

The lower limit of the angle formed by the electrode and the upper surface of the weld groove should be 0°. This is because even if the electrode is held parallel to the upper surface of the weld groove, molten metal tends to flow downwards so that the upper surface of the weld groove tends to be directly exposed to the welding arc. Thus, better penetration may be achieved even by the peripheral portion of the arc which gives a relatively lower temperature.

Obviously, the same effects may be achieved even if such welding is performed by holding the upper or lower surface of the weld groove horizontally with the electrode inclined to the surface, or by holding the electrode horizontally with the lower or upper surface of the weld groove having gradients with respect to the horizontal direction.

When the angle of the electrode to the upper surface of the weld groove is greater than 15°, various experiments have proven that excessive penetration as well as undercuts occur on the end surface of the bead.

As has been described earlier, FIGS. 6 and 7 show the angles of the electrode to the upper and lower surfaces of the weld groove in a plane perpendicular to the welding line, as well as the locuses of the tip of the electrode (shown by the solid lines D and E), when the electrode is oscillated in the widthwise direction of the base metals. FIG. 6 shows the welding of base metals by one welding pass, while FIG. 7a shows the welding of the lower surface of a weld groove in one pass, and then welding in a second pass of the upper surface of the weld groove, as shown in FIG. 7b.

FIG. 3b shows a multi-pass or multi-layer welding procedure, in which the electrode is oscillated by the procedure of the present invention within a specific range for the welding angles and the welding procedure is repeated to complete welding of the joints. The numerals shown denote the multi-pass welding sequence.

EXAMPLE 3

Figure 2E:
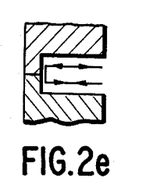
Figure 2F:
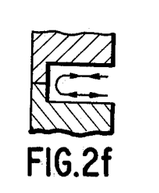
Figure 2G:
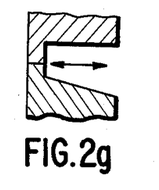
Figure 2H:
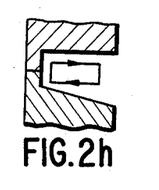
Figure 2I:
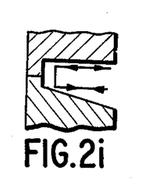

| Sample Materials: | |
|---|---|
| Base metal: | Al alloys, JIS H 4000 (1970) and 5083-O thickness 50 mm. |
| Filler wire: | Al MIG welding wire JIS Z 3232 (1970), 5183-WY, dia. 2.4 mm |
| Shielding gas: | outer shielding argon 100 liters/min. inner shielding helium 25 liters/min. |
| Groove gap: | 12 mm. |
| Welding conditions: | |
| Welding current, voltage: | 340 to 360 A, 28 to 29 V |
| Rate of oscillation: | 85 cycles/min. |
| Travelling speed: | 38 cm/min. |
| Angle of electrode: | 5° for the lower surface of a weld groove 0° for the upper surface of the groove. |
| Oscillation pattern: | FIG. 2(e) |

The test results reveal that the electrode bead has a good appearance and satisfactory bending characteristics are achieved in the side-bending test, as well as good tensile strength in the joint tensile test.

Joint tensile test:

| No. | load (kg) | cross-sectional area (mm$^2$) | tensile strength (kg/mm$^2$) |
|---|---|---|---|
| 1 | 35,443 | 49.2 × 25.1 | 28.7 |
| 2 | 35,409 | 48.7 × 24.9 | 29.2 |

Concerning the rate of oscillation, the number of oscillations of the tip of the electrode according to the present process is limited to the range of 45 to 150 cycles per minute. When aluminum alloys are welded, wherein the angle of the electrode to the surface of the molten pool is maintained over 90°, oscillation in the order of 30 cycles per minute as in the case of steel welding fails to maintain the size of the molten pool constant, with the accompanying welding defects such as lack of fusion, microfissures and the like. These welding defects become evident when the rate of oscillation is less than 45 cycles per minute. Conversely, when the rate of oscillation is more than 150 cycles per minute, then the welding arc is unstable with the attendant decrease in penetration.

The above range of oscillation cycles has proven to be satisfactory by the experiments in the present invention to prevent solidification of the peripheral portion of the molten pool as well as to maintain the size of the molten pool constant.

As has been described earlier, the electrode is oscillated and the angle of the electrode to the surface of the molten pool on the advancing side of the weld is maintained at an angle greater than 90°, while the tip of the electrode is oscillated in the widthwise direction of the base metals to 45 to 150 cycles per minute. Thus, when the electrode advances as shown by the locuses of oscillation, the electrode assumes the rearward inclined forehand welding position, so that the tip of the arc ahead of the molten pool impinges on the oxide films formed on the base metals to melt the same as well as the base metal. Consequently, the desired penetration is achieved and perfect fusion is attained in addition to minute cracks or microfissures in the weld obtained.

Figure 8:
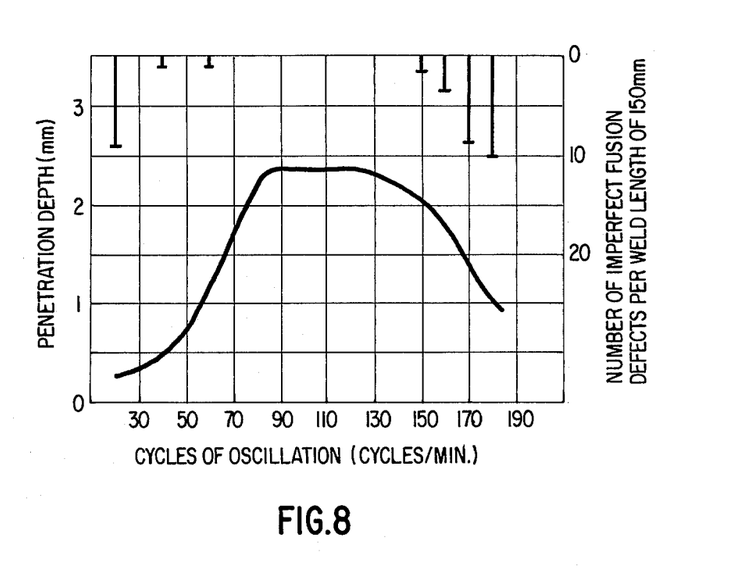
FIG. 8 shows the relationship between the penetration defects and depths of penetration as a function of oscillation cycles.

FIG. 8 shows the relationship between oscillations cycles, lack of penetration and penetration depth in the welding of aluminum alloys according to the welding process of the present invention. As is clear from this graph, oscillation rates of less than 30 cycles per minute result in insufficient penetration depth, and consequently complete fusion is not attained in many parts of the weld. On the other hand, if the oscillation rate exceeds about 40 cycles per minute, an increase in the penetration depth results and the number of joints where there is no fusion in the weld decrease. When the oscillation rate reaches about 70 cycles, fusion of the weld joint occurs and a satisfactory deposition of metal occurs. Such deposited metal may be obtained at an oscillation rate of up to about 140 cycles per minute, so that satisfactory penetration depth may be obtained within the above range. In addition, if the oscillation rate exceeds 150 cycles per minute, an unstable arc results, while the penetration depth gradually decreases.

EXAMPLE 4

| Sample materials: | |
|---|---|
| Base metal: | Al alloys, JIS H 4000 (1970) and 5083-0, thickness, 50 mm. |
| Welding wire: | Al MIG welding wire, JIS Z 3232 (1970), 5183-WY, dia. 2.4 mm. diam. |
| Shielding gas: | outer shielding argon 75 liters/min. inner shielding helium 25 liters/min. |
| Weld groove: | weld groove gap, 8 mm., 5°, inverted single-bevel |
| Welding conditions: | |
| Welding current: | 320 to 360 A |
| Welding voltage: | 29 to 30 V |
| Oscillation rate: | 80 cycles/min. |
| Welding speed: | 32 cm/min. |

The test results show that good bead appearance is obtained and satisfactory tensile strength and good bending results are obtained in the joint tensile test and the side-bending test.

In passing, the joint tensile strengths of two samples prepared in this test were found to be 30.2 kg/mm$^2$ and 29.8 kg/mm$^2$, respectively.

The advantages attained by the process of the present invention are enumerated as follows:

i. Welding of the base metals of aluminum alloys having considerable thicknesses can be achieved with ease under stable conditions in contrast to the conventional art processes which require high skill in welding the same.

ii. Since oxide films can be fused because of the heat of the welding arc, positive penetration into the deep portions of the weld groove results, thus achieving satisfactory weld beads.

iii. Even if the welding groove gap is relatively large, satisfactory penetration both into the upper and lower surfaces of the weld groove can be obtained by selecting the optimum pattern for oscillation of the tip of the welding electrode.

iv. Since the oscillation rate is defined in the range of 45 to 150 cycles/minute, i.e., since the amount of deposited metal in one oscillation cycle is reduced to give a thin layer of molten metal when the arc is moved at a high speed over the molten pool, good penetration into the entire surface of the molten pool is achieved.

v. Since the amount of metal deposited in one cycle of oscillation is reduced, the stack of molten metal on the lower surface of a weld groove is reduced so that penetration into the lower surface of the weld groove can be enhanced.

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A process for welding aluminum and aluminum alloy base metals in a horizontal welding position, wherein the base metals are placed vertically in abutting relationship to form a weld groove which is open in a sidewise direction, which comprises:

advancing a welding electrode to said weld groove such that the top of said electrode describes an oscillating pattern traversing the depth of said weld groove and such that the angle of the welding direction formed by the surface of the molten metal pool created by the advancing electrode and the vertical plane which includes the electrode axis relative to the groove which is maintained greater than 90°.

2. The process of claim 1, wherein helium or a mixture of argon and helium is used to shield the weld region of the base metals.

3. The process of claim 1, which further comprises oscillating the welding electrode in the welding groove of the base metal in a pattern traversing the depth of said weld groove, wherein the angle of said electrode to the lower surface of said welding groove as the electrode oscillates depthwise in the groove along said lower surface of said weld groove is within the range of 2° to 30° and wherein the angle of said electrode to the upper surface of said welding groove as the electrode oscillates depthwise in the groove along said upper surface of said weld groove is within the range of 0° to 15°.

4. The process of claim 1, wherein the tip of the welding electrode is oscillated at the rate of 45 to 150 cycles per minute.

5. The process of claim 1, wherein said angle is within the range of 110°-180°.

6. The process of claim 1, which further comprises:
varying the voltage of said electrode during said advancing oscillating pattern when the tip of the electrode is advanced toward the depth of said welding groove and then is reversed back towards the opening of said welding groove, such that the welding voltage in one direction of said oscillating pattern is 1-6 volts greater than the voltage in the second direction of said oscillating pattern; and
repeating the cycle of advancing and reversing the electrode to complete welding.

7. The process of claim 1, which further comprises:
welding said base metals in two passes of the welding electrode to form a layer of deposited metal in the welding groove such that in the first passage of the electrode, the electrode tip is maintained at an angle of within the range of 2° to 30° to the lower surface of the weld groove, thereby depositing the first portion of said layer of deposited metal, and in the second passage of the electrode, the electrode tip is maintained at an angle within the range of 0°-15° to the upper surface of the weld groove, thereby depositing the second portion of said layer of deposited metal.

* * * * *